US008027779B2

(12) United States Patent
Rieder et al.
(10) Patent No.: US 8,027,779 B2
(45) Date of Patent: Sep. 27, 2011

(54) METHOD AND DEVICE FOR OPERATING AN INTERNAL COMBUSTION ENGINE HAVING LAMBDA CONTROL

(75) Inventors: Gerald Rieder, Freising (DE); Paul Rodatz, Landshut (DE)

(73) Assignee: Continental Automotive GmbH, Hannover (DE)

( * ) Notice: Subject to any disclaimer, the term of this patent is extended or adjusted under 35 U.S.C. 154(b) by 647 days.

(21) Appl. No.: 12/279,085

(22) PCT Filed: Feb. 7, 2007

(86) PCT No.: PCT/EP2007/051155

§ 371 (c)(1),
(2), (4) Date: Aug. 12, 2008

(87) PCT Pub. No.: WO2007/093537

PCT Pub. Date: Aug. 23, 2007

(65) Prior Publication Data

US 2009/0030591 A1 Jan. 29, 2009

(30) Foreign Application Priority Data

Feb. 13, 2006 (DE) ........................ 10 2006 006 552

(51) Int. Cl.
*B60T 7/12* (2006.01)
*G05D 1/00* (2006.01)
*G06F 7/00* (2006.01)
*G06F 17/00* (2006.01)

(52) U.S. Cl. ......................... 701/109; 701/114; 123/674

(58) Field of Classification Search .................. 701/103, 701/109, 114; 123/396, 488, 672, 674, 676, 123/679, 685, 686, 689, 703
See application file for complete search history.

(56) References Cited

U.S. PATENT DOCUMENTS

| | | | | |
|---|---|---|---|---|
| 4,707,984 | A * | 11/1987 | Katsuno et al. | 60/274 |
| 4,901,240 | A | 2/1990 | Schmidt et al. | 364/431.06 |
| 5,483,946 | A * | 1/1996 | Hamburg et al. | 123/686 |
| 5,492,107 | A * | 2/1996 | Furuya | 123/686 |
| 5,511,526 | A * | 4/1996 | Hamburg et al. | 123/406.55 |
| 5,878,732 | A | 3/1999 | Engl et al. | 123/673 |
| 6,161,531 | A | 12/2000 | Hamburg et al. | 123/674 |
| 6,272,427 | B1 | 8/2001 | Wild et al. | 701/108 |
| 6,360,733 | B1 * | 3/2002 | Uberti Bona Blotto et al. | 123/674 |
| 6,725,826 | B2 | 4/2004 | Esteghlal | 123/295 |
| 7,191,771 | B2 | 3/2007 | Ketterer et al. | 123/674 |
| 2001/0023386 | A1 * | 9/2001 | Amtmann et al. | 701/114 |
| 2006/0167612 | A1 * | 7/2006 | Henn et al. | 701/104 |

FOREIGN PATENT DOCUMENTS

DE 36 03 137 A1 8/1987

(Continued)

*Primary Examiner* — Willis Wolfe, Jr.
*Assistant Examiner* — Anthony L Bacon
(74) *Attorney, Agent, or Firm* — King & Spalding L.L.P.

(57) ABSTRACT

When the lambda controller is active (LAM ACT), in the cold operating state (STATE COLD) and in the presence of a predefined first condition, a present cold adaptation value (AD COLD AV) is determined and the present cold adaptation value (AD COLD AV) is assigned a valid cold adaptation value (AD COLD VLD). When the lambda controller is active (LAM ACT), in the warm operating state (STATE WARM) and in the presence of a predefined second condition, a present warm adaptation value (AD WARM AV) is determined and assigned a valid warm adaptation value (AD WARM VLD). In addition, the valid cold adaptation value (AD COLD VLD) is adapted in the presence of a predefined third condition as a function of a difference (AD WARM DELTA) between the valid warm adaptation value (AD WARM VLD) and the present warm adaptation value (AD WARM AV).

20 Claims, 5 Drawing Sheets

FOREIGN PATENT DOCUMENTS

| | | | |
|---|---|---|---|
| DE | 197 39 901 | A | 3/1999 |
| DE | 196 12 453 | C2 | 11/1999 |
| DE | 103 07 004 | B3 | 8/2004 |
| DE | 10 2005 009 101 | B3 | 3/2006 |
| EP | 1 030 045 | A1 | 8/2000 |
| WO | WO 02/18767 | A1 | 3/2002 |

* cited by examiner

METHOD AND DEVICE FOR OPERATING AN INTERNAL COMBUSTION ENGINE HAVING LAMBDA CONTROL

CROSS-REFERENCE TO RELATED APPLICATIONS

This application is a U.S. national stage application of International Application No. PCT/EP2007/051155 filed Feb. 7, 2007, which designates the United States of America, and claims priority to German application number 10 2006 006 552.2 filed Feb. 13, 2008, the contents of which are hereby incorporated by reference in their entirety.

TECHNICAL FIELD

The invention relates to a method and a device for operating an internal combustion engine.

BACKGROUND

Associated with the internal combustion engine is a lambda controller. The lambda controller is designed to generate a controller control signal in the form of a correction contribution as a function of an actual value of an air-fuel ratio in a combustion chamber of the internal combustion engine and upon a predefined setpoint value of the air-fuel ratio in the combustion chamber. The internal combustion engine comprises an intake tract and an exhaust gas tract. The intake tract and the exhaust gas tract as a function of a switching position of at least one gas inlet valve and at least one gas outlet valve respectively communicate with the combustion chamber of a cylinder of the internal combustion engine. The internal combustion engine has one injection valve per cylinder for metering a fuel mass into the combustion chamber of the corresponding cylinder. The fuel mass is metered as a function of a control signal that is determined as a function of the correction contribution.

From DE 103 07 004 B3 a method of controlling an internal combustion engine with a lambda controller is known. As a function of a temperature of the internal combustion engine an adaptation value for the required fuel mass is taken from a characteristic curve. While the lambda controller is operating, a check is made to ascertain whether predetermined adaptation conditions exist. If the predetermined adaptation conditions exist, an adaptation value is determined from the controller parameters of the lambda controller and the characteristic curve is adapted as a function of the newly determined adaptation value and the temperature of the internal combustion engine.

SUMMARY

A method and a corresponding device for operating an internal combustion engine can be provided that allow precise operation of the internal combustion engine.

According to an embodiment, in a method of operating an internal combustion engine, with which a lambda controller is associated, the lambda controller being designed to generate a controller control signal in the form of a correction contribution as a function of an actual value of an air-fuel ratio in a combustion chamber and upon a predefined setpoint value of the air-fuel ratio in the combustion chamber, and which comprises an intake tract and an exhaust gas tract, which as a function of a switching position of at least one gas inlet valve and at least one gas outlet valve respectively communicate with the combustion chamber of a cylinder, and which comprises one injection valve per cylinder for metering a fuel mass into the combustion chamber of the corresponding cylinder, as a function of a control signal that is determined as a function of the correction contribution, the following steps can be executed: - as a function of at least one operating variable, determining an operating state of the internal combustion engine, which comprises a cold operating state and a warm operating state of the internal combustion engine, and - in the active state of the lambda controller, -- in the cold operating state and given the existence of a predefined first condition, --- determining a current cold adaptation value as a function of at least one component of the controller control signal, a valid cold adaptation value and a valid warm adaptation value, --- assigning the current cold adaptation value to the valid cold adaptation value, -- in the warm operating state and given the existence of a predefined second condition, --- determining a current warm adaptation value as a function of at least the component of the controller control signal and the valid warm adaptation value, --- adapting the valid cold adaptation value given the existence of a predefined third condition as a function of a difference between the valid warm adaptation value and the current warm adaptation value, --- assigning the current warm adaptation value to the valid warm adaptation value, and - in the cold operating state, determining the control signal as a function of the valid cold adaptation value and the valid warm adaptation value and in the warm operating state, determining the control signal as a function of the valid warm adaptation value.

According to a further embodiment, the valid cold adaptation value can be adapted as a function of the difference between the valid warm adaptation value and the current warm adaptation value only if the difference is greater than a predefined threshold value. According to a further embodiment, in the active state of the lambda controller the current cold and/or warm adaptation value can be assigned to the operating variable and the valid cold and/or warm adaptation value can be determined as a function of the operating variable. According to a further embodiment, as a function of the operating variable a basic fuel mass can be determined and - in the cold operating state as a function of the basic fuel mass, the valid cold and warm adaptation value and, in the active state of the lambda controller, as a function of the correction contribution the fuel mass can be determined, - in the warm operating state as a function of the basic fuel mass, the valid warm adaptation value and, in the active state of the lambda controller, as a function of the correction contribution the fuel mass can be determined, and wherein as a function of the determined fuel mass the control signal to activate the injection valve can be determined. According to a further embodiment, the lambda controller can be activated and/or deactivated as a function of the detected operating variable and/or a length of time since the beginning of the driving cycle. According to a further embodiment, the setpoint value of the air-fuel ratio in the combustion chamber can be determined as a function of the operating variable. According to a further embodiment, the operating state of the internal combustion engine can be determined as a function of a temperature and/or a load variable and/or a rotational speed of the internal combustion engine. According to a further embodiment, the predefined first and/or second condition can be determined as a function of a temperature and/or a load variable and/or a rotational speed of the internal combustion engine.

According to another embodiment, in a device for operating an internal combustion engine, with which a lambda controller is associated, the lambda controller is designed to generate a controller control signal in the form of a correction contribution as a function of an actual value of an air-fuel ratio in a combustion chamber and upon a predefined setpoint value of the air-fuel ratio in the combustion chamber. The device may comprise an intake tract and an exhaust gas tract, which as a function of a switching position of at least one gas inlet valve and at least one gas outlet valve respectively communicate with the combustion chamber of a cylinder, and which comprises one injection valve per cylinder for metering a fuel mass into the combustion chamber of the corresponding cylinder, as a function of a control signal that is determined as a function of the correction contribution. The device may be operable: - to determine an operating state of the internal combustion engine that comprises a cold operating state and a warm operating state of the internal combustion engine as a function of at least one operating variable and - in the active state of the lambda controller, -- in the cold operating state and given the existence of a predefined first condition; --- to determine a current cold adaptation value as a function of at least one component of the controller control signal, a valid cold adaptation value and a valid warm adaptation value, --- to assign the current cold adaptation value to the valid cold adaptation value, -- in the warm operating state and given the existence of a predefined second condition --- to determine a current warm adaptation value as a function of at least the component of the controller control signal and the valid warm adaptation value, --- to adapt the valid cold adaptation value given the existence of a predefined third condition as a function of a difference between the valid warm adaptation value and the current warm adaptation value, --- to assign the current warm adaptation value to the valid warm adaptation value, and - in the cold operating state to determine the control signal as a function of the valid cold adaptation value and the valid warm adaptation value and in the warm operating state to determine the control signal as a function of the valid warm adaptation value.

BRIEF DESCRIPTION OF THE DRAWINGS

There now follows a detailed description of the invention with reference to the schematic drawings. These show.

Elements of identical design or function are denoted in all of the figures by the same reference characters.

DETAILED DESCRIPTION

Figure 1:
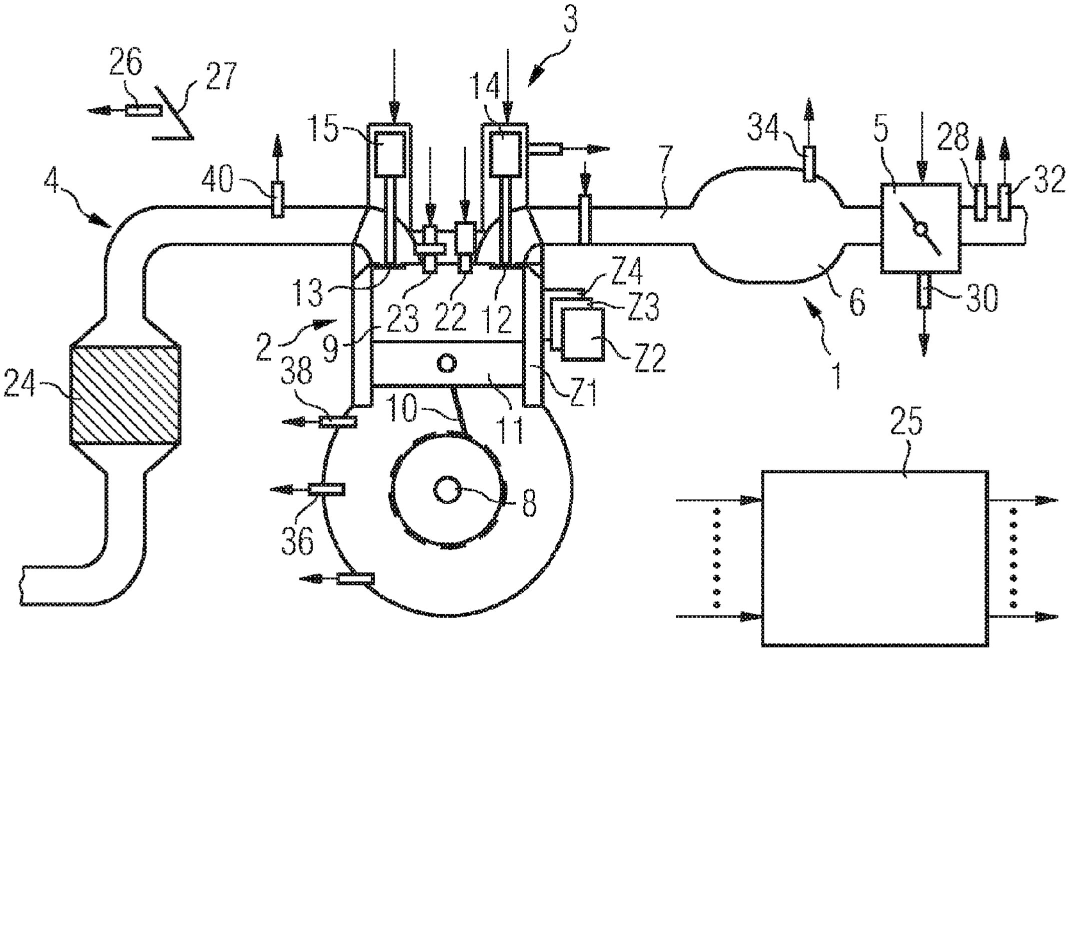
FIG. 1 a schematic representation of an internal combustion engine.

The various embodiments are distinguished by a method and a device for operating an internal combustion engine. Associated with the internal combustion engine is a lambda controller. The lambda controller is designed to generate a controller control signal in the form of a correction contribution as a function of an actual value of an air-fuel ratio in a combustion chamber of the internal combustion engine and upon a predefined setpoint value of the air-fuel ratio in the combustion chamber. The internal combustion engine comprises an intake tract and an exhaust gas tract, which as a function of a switching position of at least one gas inlet valve and at least one gas outlet valve respectively communicate with the combustion chamber of a cylinder of the internal combustion engine. The internal combustion engine further comprises one injection valve per cylinder for metering a fuel mass into the combustion chamber of the corresponding cylinder. The injection valve is activated as a function of a control signal that is determined as a function of the correction contribution. An operating state of the internal combustion engine is determined as a function of at least one operating variable of the internal combustion engine. The operating state comprises a cold operating state and a warm operating state of the internal combustion engine. Given an active lambda controller, the cold operating state and the existence of a predefined first condition, a current cold adaptation value is determined as a function of at least one component of the controller signal, a valid cold adaptation value and a valid warm adaptation value. The current cold adaptation value is assigned to the valid cold adaptation value. Given an active lambda controller, the warm operating state and the existence of a predefined second condition, a current warm adaptation value is determined as a function of at least the component of the controller control signal and the valid warm adaptation value. Given the existence of a predefined third condition, the valid cold adaptation value is adapted as a function of a difference between the valid warm adaptation value and the current warm adaptation value. The current warm adaptation value is assigned to the valid warm adaptation value. Given the cold operating state, the control signal is determined as a function of the valid cold adaptation value and the valid warm adaptation value. Given the warm operating state, the control signal is determined as a function of the valid warm adaptation value.

By virtue of adapting the valid cold adaptation value as a function of the difference between the valid and the current warm adaptation value, precise operation of the internal combustion engine independently of any system tolerances of the internal combustion engine is already possible during a second cold start after an extreme variation of the cold and warm adaptation value. The extreme variation may be caused for example by a deletion of the valid cold and warm adaptation value during an exhaust gas test and/or by transporting the switched-off internal combustion engine to a location, the altitude of which differs extremely from the altitude of the location prior to transportation, and/or in the event of a fuel quality that varies from one driving cycle to the other, for example after filling the fuel tank abroad and/or alternate use of regular and premium gasoline.

In an embodiment of the method, the valid cold adaptation value is adapted as a function of the difference between the valid warm adaptation value and the current warm adaptation value only if the difference is greater than a predefined threshold value. This helps avoid an unnecessary adaptation of the valid cold adaptation value.

In a further embodiment of the method, in the active state of the lambda controller the current cold and/or warm adaptation value is assigned to the operating variable. The valid cold and/or warm adaptation value is determined as a function of the operating variable. This contributes towards particularly precise operation of the internal combustion engine.

In a further embodiment of the method, a basic fuel mass is determined as a function of the operating variable. Given the cold operating state, the fuel mass is determined as a function of the basic fuel mass, the valid cold and warm adaptation value and, in the active state of the lambda controller, as a function of the correction contribution. Given the warm operating state, the fuel mass is determined as a function of the basic fuel mass, the valid warm adaptation value and, in the active state of the lambda controller, as a function of the correction contribution. As a function of the determined fuel mass the control signal for activating the injection valve is determined. This enables precise closed-loop control of the air-fuel ratio in the combustion chamber.

In a further embodiment of the method, the lambda controller is activated and/or deactivated as a function of the detected operating variable and/or a length of time since the beginning of the driving cycle. This makes it possible to switch between open-loop control and closed-loop control of the internal combustion engine as a function of the performance state.

In a further embodiment of the method, the setpoint value of the air-fuel ratio in the combustion chamber is determined as a function of the operating variable. This contributes towards particularly precise operation of the internal combustion engine.

In a further embodiment of the method, the operating state of the internal combustion engine is determined as a function of a temperature and/or a load variable and/or a rotational speed of the internal combustion engine. This contributes towards particularly precise determination of the operating state.

In a further embodiment of the method, the predefined first and/or second condition is determined as a function of the temperature and/or the load variable and/or the rotational speed of the internal combustion engine. This helps to determine only suitable current cold and/or warm adaptation values.

The embodiments of the method may be translated without difficulty to the corresponding device for implementing the method.

An internal combustion engine (FIG. 1) comprises an intake tract 1, an engine block 2, a cylinder head 3 and an exhaust gas tract 4. The intake tract 1 may preferably comprise a throttle valve 5, as well as a collector 6 and an intake manifold 7 that extends in the direction of a cylinder Z1 via an inlet channel into the engine block 2. The engine block 2 further comprises a crankshaft 8 that is coupled by a connecting rod 10 to the piston 11 of the cylinder Z1. The internal combustion engine may preferably be disposed in a motor vehicle.

The cylinder head 3 comprises a valve gear having at least one gas inlet valve 12, at least one gas outlet valve 13 and valve actuators 14, 15. The cylinder head 3 further comprises an injection valve 22 and a spark plug 23. Alternatively, the injection valve 22 may also be disposed in the intake manifold 7.

An open-loop control device 25 is provided, associated with which are sensors that detect various measured variables and determine in each case the value of the measured variable. Operating variables comprise the measured variables and variables of the internal combustion engine that are derived therefrom. Operating variables may be representative of an operating state STATE of the internal combustion engine. The open-loop control device 25 as a function of at least one of the operating variables determines at least one manipulated variable, which is then converted into one or more control signals for open-loop control of the final control elements by means of corresponding final control element operators. The open-loop control device 25 may also be described as a device for operating the internal combustion engine.

The operating state STATE may be for example a cold operating state STATE_COLD and/or a warm operating state STATE_WARM. The operating states may moreover be further subdivided, for example into a warm operating state STATE_WARM at no load and/or into a warm operating state STATE_WARM in the partial load range and/or into a warm operating state STATE_WARM in the top load range of the internal combustion engine. Furthermore, the cold operating state STATE_COLD may also be further subdivided. If the internal combustion engine is not in the warm operating state STATE_WARM, the internal combustion engine is in the cold operating state STATE_COLD. The warm operating state STATE_WARM may for example be characterized in that a temperature of the internal combustion engine is above 70° Celsius.

The sensors are a pedal position sensor 26 that detects a gas pedal position of a gas pedal 27, an air mass sensor 28 that detects an air mass flow upstream of the throttle valve 5, a throttle valve position sensor 30 that detects an opening angle of the throttle valve 5, a first temperature sensor 32 that detects an intake air temperature, an intake manifold pressure sensor 34 that detects an intake manifold pressure in the collector 6, a crankshaft angle sensor 36 that detects a crankshaft angle, with which a rotational speed N is then associated. A second temperature sensor 38 detects a cooling water temperature. A third temperature sensor may also be provided for detecting an oil temperature of the internal combustion engine. There may moreover preferably be disposed in the exhaust gas tract an exhaust gas probe 40, the measuring signal of which is representative of an air-fuel ratio in the combustion chamber 9. Depending on the embodiment any desired subset of the described sensors may be provided or alternatively additional sensors may be provided.

The final control elements are for example the throttle valve 5, the gas inlet- and gas outlet valves 12, 13, the injection valve 22 and/or the spark plug 23.

Preferably, in addition to the cylinder Z1 further cylinders Z2 to Z4 can also be provided, with which corresponding final control elements are then also associated. It is however also possible to provide further cylinders.

A program for operating the internal combustion engine (FIG. 2) can be preferably stored in the open-loop control device 25. The program is used to compensate system-dependent variations of the air-fuel ratio in the combustion chamber 9 during operation of the internal combustion engine. The air-fuel ratio in the combustion chamber 9 is the air-fuel ratio in the combustion chamber 9 of the internal combustion engine after the air mass flow has flowed from the intake tract 1 into the combustion chamber 9 and a fuel mass MFF has been metered and before the air-fuel mixture is burnt. The system-dependent variations can be compensated in such a way that a preferably optimum air-fuel ratio in the combustion chamber 9 during operation of the internal combustion engine is adjusted already during a second cold start of the internal combustion engine after a deletion of all of the adaptation values AD_COLD_VLD, AD_WARM_VLD and/or after transportation of the internal combustion engine to a location, the altitude of which differs extremely from the altitude of the location prior to transportation, and/or after a variation of the fuel quality, for example after filling the tank with fuel abroad and/or after a change between regular gasoline and premium gasoline. The air-fuel ratio in the combustion chamber may also differ from the optimum air-fuel ratio.

The system-dependent variations occur for example as a result of manufacturing tolerances of the components of the internal combustion engine. The system tolerances may be for example system tolerances of the injection valve 22, in particular injection holes of differing size and/or differently reacting actuators of the injection valves 22. The system tolerances may moreover relate to the opening angle of the throttle valve 5 and/or a position of the gas inlet valve 12.

The program can be preferably started at a time close to a start of the internal combustion engine in step S1. In step S1 optionally variables are initialized.

In step S2 a temperature TEMP_AV and preferably a load variable LOAD and a rotational speed N of the internal combustion engine can be detected. The load variable LOAD may be, for example, the air mass flow into the combustion chamber 9. The air mass flow into the combustion chamber 9 may be detected by means of an air mass sensor in the intake manifold 7 or determined from an intake manifold model as a function of at least one of the measured variables.

In step S3 preferably as a function of the detected temperature TEMP_AV a setpoint value LAMB_SP of the air-fuel ratio in the combustion chamber 9 can be determined. In an alternative embodiment of the setpoint value LAMB_SP may be a constant value.

In step S4 it is checked whether the lambda controller is active. The lambda controller may for example be activated a predefined length of time after the cold start of the internal combustion engine and/or at a predefined temperature of the internal combustion engine. The predefined length of time DUR may be for example 20 seconds. The predefined temperature may be for example 20° Celsius. If the lambda controller is active (LAM_ACT), the processing is continued in step S5. If the lambda controller is not active, then the processing is continued in step S10. If the lambda controller is active (LAM_ACT), it then generates as a function of the determined setpoint value LAMB_SP of the air-fuel ratio in the combustion chamber 9 and upon an actual value LAMB_AV of the air-fuel ratio in the combustion chamber 9 a controller control signal in the form of a correction contribution LAM_COR, as a function of which the air-fuel ratio in the combustion chamber 9 is corrected. The correction of the air-fuel ratio in the combustion chamber 9 may be effected preferably by means of a correction of the fuel mass MFF. In an alternative embodiment the correction of the air-fuel ratio in the combustion chamber 9 may alternatively be effected by means of a correction of the air mass flow into the combustion chamber 9.

Figure 3:
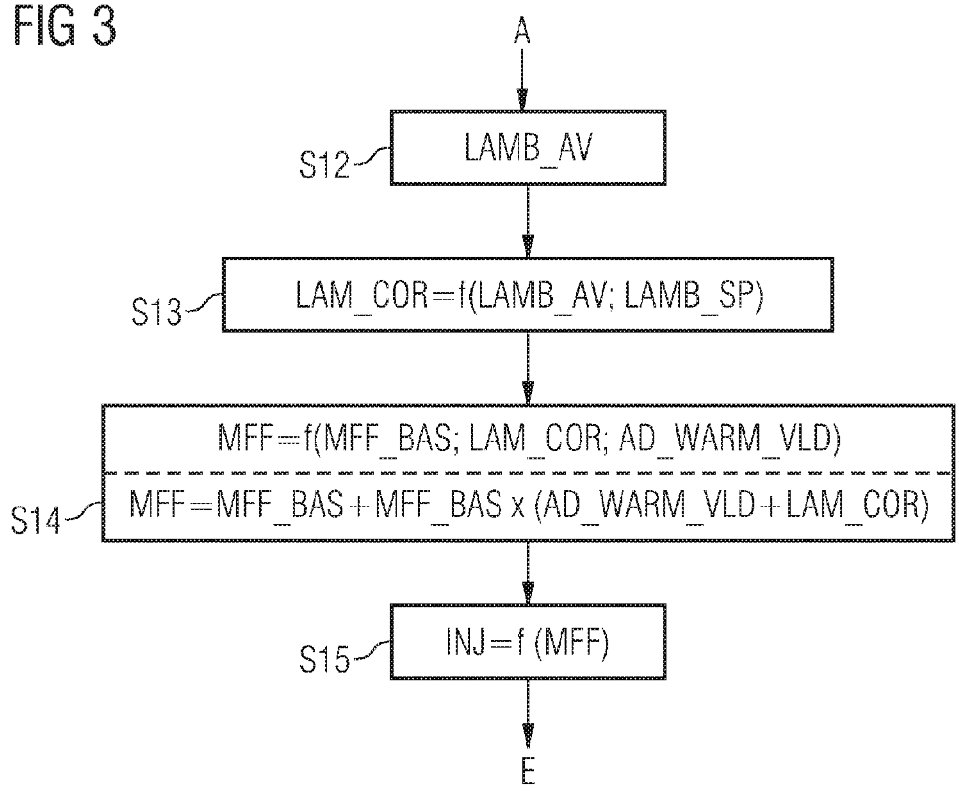

In step S5 it is checked whether the internal combustion engine is in the warm operating state STATE_WARM. If the condition in step S5 is met, then the processing is continued in step S12 (FIG. 3). If the condition in step S5 is not met, then the processing is continued in step S6.

In step S6 the actual value LAMB_AV of the air-fuel ratio in the combustion chamber 9 is determined.

In step S7 as a function of the actual value LAMB_AV of the air-fuel ratio in the combustion chamber 9 and upon the determined setpoint value LAMB_SP of the fuel-air ratio in the combustion chamber 9 the correction contribution LAM_COR is determined. The correction contribution LAM_COR can be preferentially expressed as a percentage that indicates how many percent more or less fuel relative to a basic fuel mass MFF_BAS has to be injected for the air-fuel ratio in the combustion chamber 9 to be adapted to the setpoint value LAMB_SP of the air-fuel ratio in the combustion chamber 9. Preferably, the correction contribution LAM_COR may be obtained from a controller control signal and/or from a component of the controller control signal of the lambda controller. The component of the controller control signal may be for example an integral-action component of the controller control signal of the lambda controller. The integral-action component of the controller control signal is representative of a mean displacement of the basic fuel mass MFF_BAS.

In step S8 the fuel mass MFF can be determined as a function of the basic fuel mass MFF_BAS, the correction contribution LAM_COR, a valid cold adaptation value AD_COLD_VLD and a valid warm adaptation value AD_WARM_VLD, preferably in accordance with the calculation rule specified in step S8. In the cold operating state STATE_COLD the fuel mass MFF is determined as a function of the valid cold adaptation value AD_COLD_VLD and the valid warm adaptation value AD_WARM_VLD so that a change of ambient conditions, for example the altitude, and/or a change of the system-dependent tolerances that are detected in the warm operating state STATE_WARM is taken into account already after the next start of the internal combustion engine in the cold operating state STATE_COLD.

In step S9 the injection valve 22 is activated to inject INJ the fuel mass MFF. For this purpose, as a function of the fuel mass MFF a control signal for activating the injection valve 22 is determined.

In step S12 (FIG. 3) the actual value LAMB_AV of the air-fuel ratio in the combustion chamber 9 is determined.

In step S13, in accordance with step S7 the correction contribution LAM_COR is determined.

In step S14 the fuel mass MFF can be determined as a function of the basic fuel mass MFF_BAS, the correction contribution LAM_COR and the valid warm adaptation value AD_WARM_VLD and independently of the valid cold adaptation value AD_COLD_VLD, preferably in accordance with the calculation rule specified in step S14.

In step S15, in accordance with step S9 the injection valve 22 is activated as a function of the fuel mass MFF.

Figure 4:
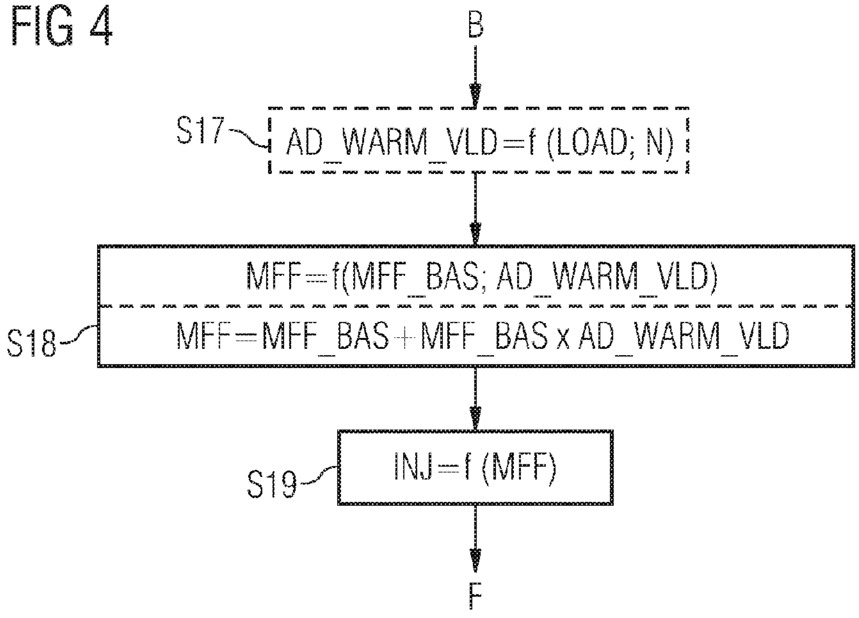
Figure 5:
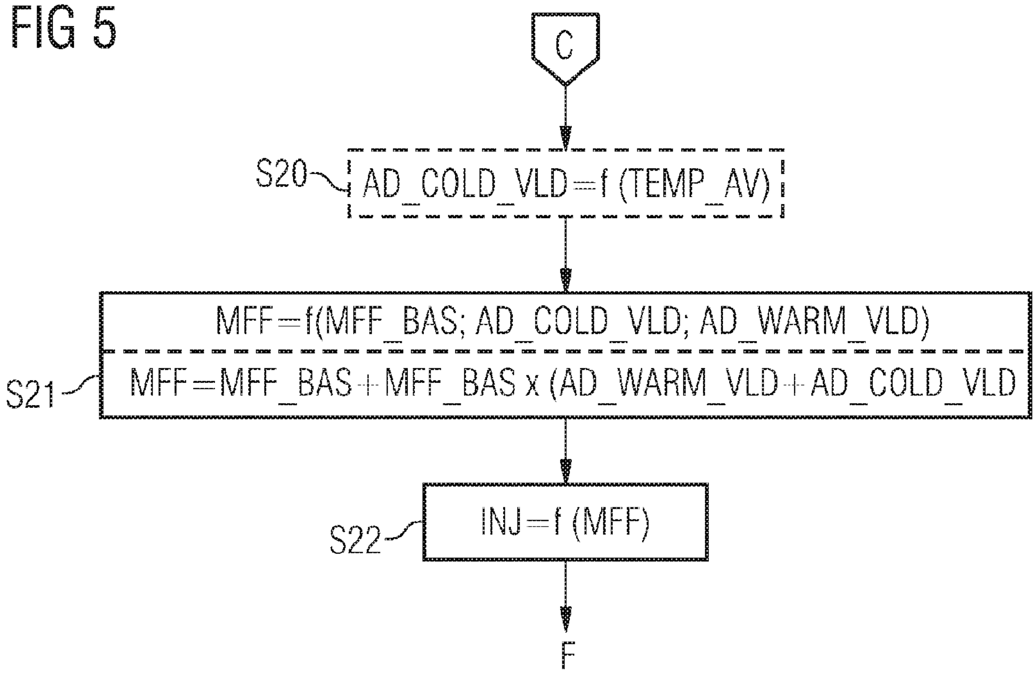

In step S10 (FIG. 2), in accordance with step S5 it is checked whether the internal combustion engine is in the warm operating state STATE_WARM. If the condition in step S10 is met, then the processing is continued in step S17 (FIG. 4). If the condition in step S10 is not met, then the processing is continued in step S20 (FIG. 5).

In step S17 the valid warm adaptation value AD_WARM_VLD may be determined preferably as a function of at least one of the measured variables, preferably as a function of the load variable LOAD and the rotational speed N. The valid warm adaptation value AD_WARM_VLD may for example be stored in a characteristics map that has, as input variables, the load variable LOAD and/or the rotational speed N of the internal combustion engine. Preferably only three valid warm adaptation values AD_WARM_VLD as a function of the load variable LOAD and the rotational speed N can be stored. These are a valid warm adaptation value AD_WARM_VLD at no load of the internal combustion engine, a valid warm adaptation value AD_WARM_VLD for the partial load range of the internal combustion engine and a valid warm adaptation value AD_WARM_VLD for the top load range of the internal combustion engine. The characteristics map may be determined for example on an engine test bench. In an alternative embodiment the warm adaptation value AD_WARM_VLD may be a constant value.

In step S18 the fuel mass MFF may be determined as a function of the basic fuel mass MFF_BAS and, as the lambda controller is not active and the warm operating state STATE_WARM exists, only as a function of the valid warm adaptation value AD_WARM_VLD, preferably in accordance with the calculation rule specified in step S18.

In step S19, in accordance with step S9 and step S15 the injection valve 22 is activated to inject the fuel mass MFF.

In step S20 (FIG. 5) the valid cold adaptation value AD_COLD_VLD may be determined preferably as a function of the detected temperature TEMP_AV. In an alternative embodiment, the valid cold adaptation value AD_COLD_VLD may also be a constant value.

In step S21 the fuel mass MFF may be determined as a function of the basic fuel mass MFF_BAS, the valid cold adaptation value AD_COLD_VLD and the valid warm adaptation value AD_WARM_VLD, preferably in accordance with the calculation rule specified in step S21. Given the subdivision of the warm operating state STATE_WARM, the warm adaptation value AD_WARM_VLD used to determine the fuel mass MFF in the cold operating state STATE_COLD may be preferably the warm adaptation value in the partial load range of the internal combustion engine.

In step S22, in accordance with step S9 the injection valve 22 is activated to inject the fuel mass MFF.

Figure 2:
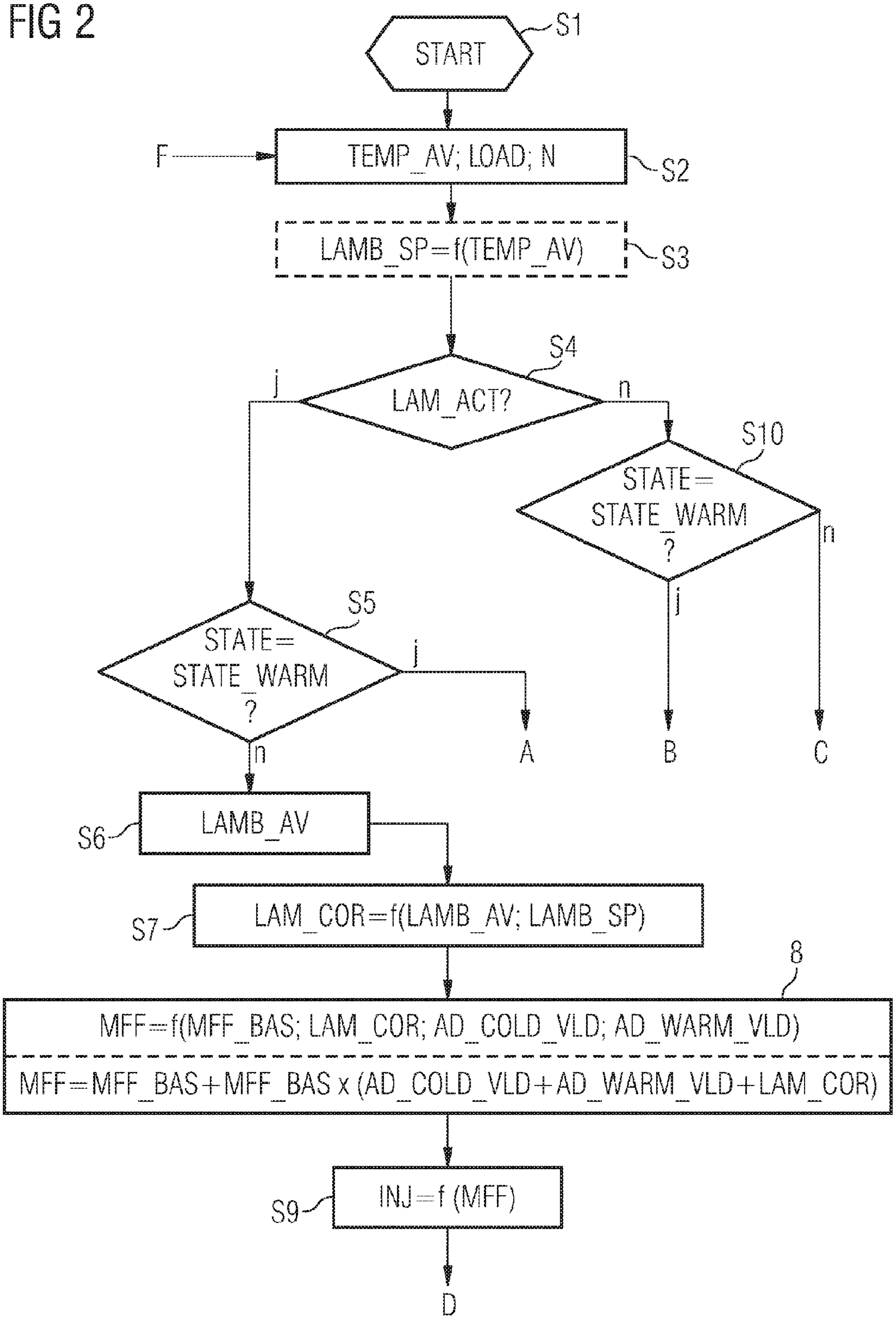
FIG. 2 a flowchart of a program for operating the internal combustion engine, FIG. 3 a first continuation of the program, FIG. 4 a second continuation of the program, FIG. 5 a third continuation of the program, FIG. 6 a fourth continuation of the program, FIG. 7 a fifth continuation of the program.
Figure 6:
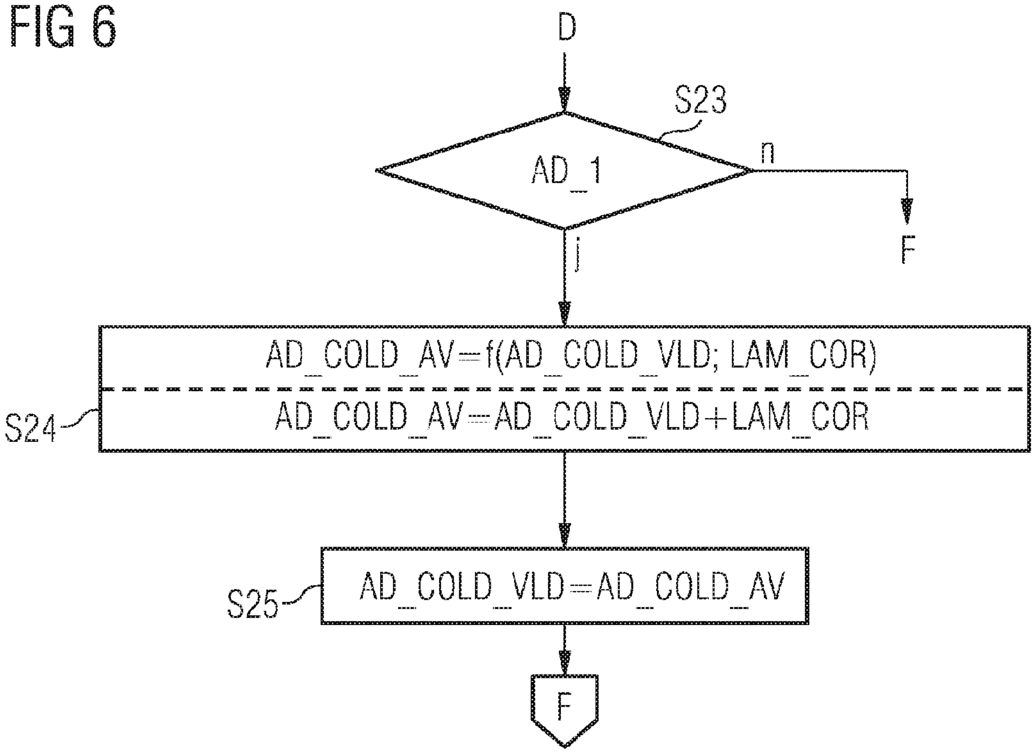

In step S23 (FIG. 6) it is checked whether a first condition AD_1 exists. The first condition may be characterized for example by operation of the internal combustion engine at no load. The first condition AD_1 is met if a value of the load variable LOAD lies in the bottom load range of the internal combustion engine. If the condition in step S23 is not met, then the processing may be continued preferably in step S2 (FIG. 2). If the condition in step S23 is met, then the processing is continued in step S24.

In step S24 a current cold adaptation value AD_COLD_AV may be determined as a function of the valid cold adaptation value AD_COLD_VLD and the correction contribution LAM_COR, preferably in accordance with the calculation rule specified in step S24.

In step S25 the current cold adaptation value AD_COLD_AV is assigned to the valid cold adaptation value AD_COLD_VLD. This means that the valid cold adaptation value AD_COLD_VLD may be replaced by the current cold adaptation value AD_COLD_AV and so the current cold adaptation value AD_COLD_AV may become the valid cold adaptation value AD_COLD_VLD. The processing may then be continued preferably in step S2 (FIG. 2).

Figure 7:
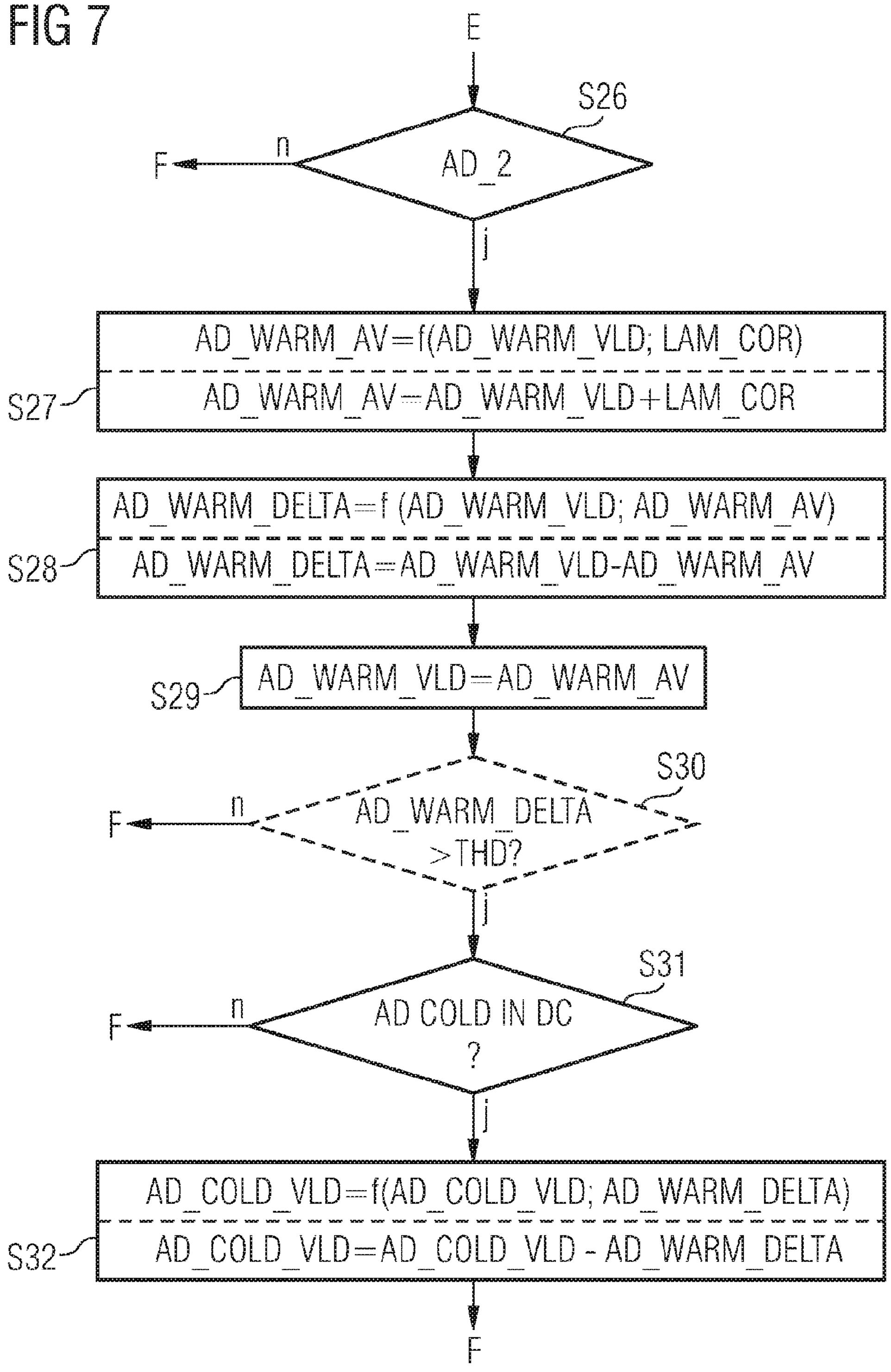

In step S26 (FIG. 7) it can be checked whether a second condition AD_2 exists. The second condition AD_2 may be characterized for example by operation of the internal combustion engine at no load, in the partial load range and/or in the top load range. The second condition AD_2 is met if the value of the load variable LOAD lies in the bottom load range and/or in the partial load range and/or in the top load range. If the condition in step S26 is met, then the processing is continued in step S27. If the condition in step S26 is not met, then the processing may be continued preferably in step S2 (FIG. 2).

In step S27 the current warm adaptation value AD_WARM_AV may be determined as a function of the valid warm adaptation value AD_WARM_VLD and the correction contribution LAM_COR, preferably in accordance with the calculation rule specified in step S27.

In step S28 a difference AD_WARM_DELTA between the current warm adaptation value AD_WARM_AV and the valid warm adaptation value AD_WARM_VLD may be determined as a function of the current warm adaptation value AD_WARM_AV and the valid warm adaptation value AD_WARM_VLD, preferably in accordance with the calculation rule specified in step S28.

In step S29, in accordance with step S25 the current warm adaptation value AD_WARM_AV is assigned to the valid warm adaptation value AD_WARM_VLD.

In step S30 and in step S31 it is checked whether a third condition exists. The third condition may be preferably characterized in that the difference AT_WARM_DELTA is greater than a predefined threshold value THD and that in the same driving cycle DC the valid cold adaptation value AD_COLD_VLD was adapted to the current cold adaptation value AD_COLD_AV, namely AD COLD IN DC.

In step S30 it is checked whether the difference AT_WARM_DELTA is greater then the predefined threshold value THD. If the condition in step S30 is not met, the processing may then be continued preferably in step S2. If the condition in step S30 is met, however, then the processing is continued in step S31.

In step S31 it is checked whether during the same driving cycle DC in the cold operating state STATE_COLD an adaptation of the valid cold adaptation value AD_COLD_VLD was implemented. The driving cycle DC extends from a cold start of the internal combustion engine, through the warm operating state up to switching-off of the internal combustion engine. If the condition in step S31 is not met, then the processing may be continued preferably in step S2. If the condition in step S31 is met, however, then the processing is continued in step S32.

In step S32 the valid cold adaptation value AD_COLD_VLD may be adapted as a function of the difference AD_WARM_DELTA, preferably in accordance with the calculation rule specified in step S32. The effect achieved by adapting the valid cold adaptation value AD_COLD_VLD as a function of the difference AT_WARM_DELTA is however that already during the second cold start after the deletion of the adaptation values AD_WARM_VLD, AD_COLD_VLD and/or after transportation of the internal combustion engine the air-fuel ratio in the combustion chamber 9 may be preferably optimal. This is particularly advantageous because according to the current statutory provisions for an exhaust gas test all adaptation values are required to be deleted and the exhaust gas test is carried out after the first driving cycle DC during the second cold start. The processing may then be continued preferably in step S2.

The invention claimed is:

1. A method of operating an internal combustion engine, with which a lambda controller is associated, the lambda controller being designed to generate a controller control signal in the form of a correction contribution as a function of an actual value of an air-fuel ratio in a combustion chamber and upon a predefined setpoint value of the air-fuel ratio in the combustion chamber, and which comprises an intake tract and an exhaust gas tract, which as a function of a switching position of at least one gas inlet valve and at least one gas outlet valve respectively communicate with the combustion chamber of a cylinder, and which comprises one injection valve per cylinder for metering a fuel mass into the combustion chamber of the corresponding cylinder, as a function of a control signal that is determined as a function of the correction contribution, the method comprising the steps of:

as a function of at least one operating variable, determining an operating state of the internal combustion engine, which comprises a cold operating state and a warm operating state of the internal combustion engine, and in the active state of the lambda controller, in the cold operating state and given the existence of a predefined first condition determining a current cold adaptation value as a function of at least one component of the controller control signal, a valid cold adaptation value and a valid warm adaptation value, assigning the current cold adaptation value to the valid cold adaptation value, in the warm operating state and given the existence of a predefined second condition determining a current warm adaptation value as a function of at least the component of the controller control signal and the valid warm adaptation value, adapting the valid cold adaptation value given the existence of a predefined third condition as a function of a difference between the valid warm adaptation value and the current warm adaptation value, assigning the current warm adaptation value to the valid warm adaptation value, and in the cold operating state, determining the control signal as a function of the valid cold adaptation value and the valid warm adaptation value and in the warm operating state, determining the control signal as a function of the valid warm adaptation value.

2. The method according to claim 1, wherein the valid cold adaptation value is adapted as a function of the difference between the valid warm adaptation value and the current warm adaptation value only if the difference is greater than a predefined threshold value.

3. The method according to claim 1, wherein in the active state of the lambda controller the current cold or warm adaptation value is assigned to the operating variable and wherein the valid cold or warm adaptation value is determined as a function of the operating variable.

4. The method according claim 1, wherein as a function of the operating variable a basic fuel mass is determined and wherein in the cold operating state as a function of the basic fuel mass, the valid cold and warm adaptation value and, in the active state of the lambda controller, as a function of the correction contribution the fuel mass is determined, in the warm operating state as a function of the basic fuel mass, the valid warm adaptation value and, in the active state of the lambda controller, as a function of the correction contribution the fuel mass is determined, and wherein as a function of the determined fuel mass the control signal to activate the injection valve is determined.

5. The method according to claim 1, wherein the lambda controller is activated or deactivated as a function of the detected operating variable or a length of time since the beginning of the driving cycle.

6. The method according to claim 1, wherein the setpoint value of the air-fuel ratio in the combustion chamber is determined as a function of the operating variable.

7. The method according to claim 1, wherein the operating state of the internal combustion engine is determined as a function of a temperature or a load variable or a rotational speed of the internal combustion engine.

8. The method according to claim 1, wherein the predefined first or second condition is determined as a function of a temperature or a load variable or a rotational speed of the internal combustion engine.

9. The method according to claim 1, wherein in the active state of the lambda controller the current cold and warm adaptation value is assigned to the operating variable and wherein the valid cold and warm adaptation value is determined as a function of the operating variable.

10. The method according to claim 1, wherein the lambda controller is activated and deactivated as a function of the detected operating variable and a length of time since the beginning of the driving cycle.

11. The method according to claim 1, wherein the operating state of the internal combustion engine is determined as a function of a temperature and a load variable and a rotational speed of the internal combustion engine.

12. The method according to claim 1, wherein the predefined first and second condition is determined as a function of a temperature and a load variable and a rotational speed of the internal combustion engine.

13. A device for operating an internal combustion engine, with which a lambda controller is associated, the lambda controller being designed to generate a controller control signal in the form of a correction contribution as a function of an actual value of an air-fuel ratio in a combustion chamber and upon a predefined setpoint value of the air-fuel ratio in the combustion chamber, and which comprises an intake tract and an exhaust gas tract, which as a function of a switching position of at least one gas inlet valve and at least one gas outlet valve respectively communicate with the combustion chamber of a cylinder, and which comprises one injection valve per cylinder for metering a fuel mass into the combustion chamber of the corresponding cylinder, as a function of a control signal that is determined as a function of the correction contribution, wherein the device is operable:

to determine an operating state of the internal combustion engine that comprises a cold operating state and a warm operating state of the internal combustion engine as a function of at least one operating variable and in the active state of the lambda controller, in the cold operating state and given the existence of a predefined first condition, to determine a current cold adaptation value as a function of at least one component of the controller control signal, a valid cold adaptation value and a valid warm adaptation value, to assign the current cold adaptation value to the valid cold adaptation value, in the warm operating state and given the existence of a predefined second condition to determine a current warm adaptation value as a function of at least the component of the controller control signal and the valid warm adaptation value, to adapt the valid cold adaptation value given the existence of a predefined third condition as a function of a difference between the valid warm adaptation value and the current warm adaptation value, to assign the current warm adaptation value to the valid warm adaptation value, and in the cold operating state to determine the control signal as a function of the valid cold adaptation value and the valid warm adaptation value and in the warm operating state to determine the control signal as a function of the valid warm adaptation value.

14. The device according to claim 13, wherein the device is operable to adapt the valid cold adaptation value as a function of the difference between the valid warm adaptation value and the current warm adaptation value only if the difference is greater than a predefined threshold value.

15. The device according to claim 13, wherein in the active state of the lambda controller the device is operable to assign the current cold or warm adaptation value to the operating variable and wherein the device is operable to determine the valid cold or warm adaptation value as a function of the operating variable.

16. The device according to claim 13, wherein as a function of the operating variable a basic fuel mass is determined and wherein in the cold operating state as a function of the basic fuel mass, the valid cold and warm adaptation value and, in the active state of the lambda controller, as a function of the correction contribution the fuel mass is determined, in the warm operating state as a function of the basic fuel mass, the valid warm adaptation value and, in the active state of the lambda controller, as a function of the correction contribution the fuel mass is determined, and wherein as a function of the determined fuel mass the control signal to activate the injection valve is determined.

17. The device according to claim 13, wherein the lambda controller is activated or deactivated as a function of the detected operating variable or a length of time since the beginning of the driving cycle.

18. The device according to claim 13, wherein the setpoint value of the air-fuel ratio in the combustion chamber is determined as a function of the operating variable.

19. The device according to claim 13, wherein the operating state of the internal combustion engine is determined as a function of a temperature or a load variable or a rotational speed of the internal combustion engine.

20. The device according to claim 13, wherein the predefined first or second condition is determined as a function of a temperature or a load variable or a rotational speed of the internal combustion engine.

* * * * *